United States Patent
Storm et al.

(10) Patent No.: US 11,507,693 B2
(45) Date of Patent: Nov. 22, 2022

(54) SYSTEMS AND METHODS FOR PROVIDING A BLIND DE-IDENTIFICATION OF PRIVACY DATA

(71) Applicant: TripleBlind, Inc., Kansas City, MO (US)

(72) Inventors: Greg Storm, Parkville, MO (US); Babak Poorebrahim Gilkalaye, Kansas City, MO (US); Riddhiman Das, Lenexa, KS (US)

(73) Assignee: TripleBlind, Inc., Kansas City, MO (US)

( * ) Notice: Subject to any disclaimer, the term of this patent is extended or adjusted under 35 U.S.C. 154(b) by 0 days.

(21) Appl. No.: 17/530,541

(22) Filed: Nov. 19, 2021

(65) Prior Publication Data

US 2022/0164479 A1    May 26, 2022

Related U.S. Application Data

(60) Provisional application No. 63/116,656, filed on Nov. 20, 2020.

(51) Int. Cl.
*G06F 21/62* (2013.01)
(52) U.S. Cl.
CPC .............................. *G06F 21/6254* (2013.01)
(58) Field of Classification Search
CPC .................................................. G06F 21/6254
See application file for complete search history.

(56) References Cited

U.S. PATENT DOCUMENTS

| | | | |
|---|---|---|---|
| 6,353,816 B1 | 3/2002 | Tsukimoto | |
| 10,002,029 B1 | 6/2018 | Bequet | |
| 10,833,871 B2 | 11/2020 | Ranellucci | |
| 10,873,456 B1 * | 12/2020 | Dods | G06N 20/00 |
| 10,924,460 B2 | 2/2021 | Storm | |

(Continued)

FOREIGN PATENT DOCUMENTS

WO    WO 2021/119365    6/2021

OTHER PUBLICATIONS

Thapa et al., "SplitFed: When Federated Learning Meets Split Learning", Cornell University Library/Computer Science/Machine Learning, Apr. 25, 2020, [online] [retrieved on Dec. 15, 2021] Retrieved from the Internet URL:arXiv:2004.12088y, entire document.

(Continued)

*Primary Examiner* — Joseph P Hirl
*Assistant Examiner* — Stephen T Gundry

(57) ABSTRACT

Disclosed is a system and method of de-identifying data. A method includes splitting, at a first entity, a byte of data of an original record into a first random portion and a second random portion, inserting first random bits into the first random portion to yield a first new byte and inserting second random bits into the second random portion to yield a second new byte. The method then includes transmitting the second new byte to a second entity, receiving, at the first entity, a first portion of an algorithm from the second entity and processing the first new byte by the first portion of the algorithm to yield a first partial result. The first partial result can be combined with a second partial result from the second entity processing the second new byte by a second portion of the algorithm.

17 Claims, 6 Drawing Sheets

(56) References Cited

U.S. PATENT DOCUMENTS

| | | | |
|---|---|---|---|
| 10,999,355 B1* | 5/2021 | Chu | G06F 21/6272 |
| 11,316,676 B2 | 4/2022 | Kinjo | |
| 2006/0233377 A1 | 10/2006 | Chang | |
| 2008/0082636 A1 | 4/2008 | Hofmann | |
| 2010/0281254 A1 | 11/2010 | Carro | |
| 2011/0161091 A1 | 6/2011 | Freishtat | |
| 2012/0047097 A1 | 2/2012 | Sengupta et al. | |
| 2014/0108813 A1 | 4/2014 | Pauker et al. | |
| 2016/0103901 A1 | 4/2016 | Kadav et al. | |
| 2016/0294550 A1 | 10/2016 | French | |
| 2016/0335440 A1 | 11/2016 | Clark | |
| 2016/0342608 A1* | 11/2016 | Burshteyn | H04L 63/0428 |
| 2017/0116520 A1 | 4/2017 | Min | |
| 2017/0149796 A1 | 5/2017 | Gvili | |
| 2017/0228547 A1 | 8/2017 | Smith | |
| 2017/0323196 A1 | 11/2017 | Gibson | |
| 2017/0359321 A1 | 12/2017 | Teranishi | |
| 2017/0372201 A1* | 12/2017 | Gupta | G06N 3/0454 |
| 2018/0039884 A1* | 2/2018 | Dalton | G06N 3/0454 |
| 2018/0041477 A1 | 2/2018 | Shaposhnik | |
| 2018/0157972 A1 | 6/2018 | Hu | |
| 2018/0227296 A1 | 8/2018 | Joshi | |
| 2018/0330237 A1 | 11/2018 | Yoshiyama | |
| 2018/0367509 A1* | 12/2018 | O'Hare | G06F 21/6218 |
| 2019/0005399 A1 | 1/2019 | Noguchi | |
| 2019/0130265 A1 | 5/2019 | Ling | |
| 2019/0228299 A1 | 7/2019 | Chandran | |
| 2019/0286973 A1 | 9/2019 | Kovvuri | |
| 2019/0294805 A1 | 9/2019 | Taylor | |
| 2019/0312772 A1 | 10/2019 | Zhao | |
| 2019/0332944 A1 | 10/2019 | Bai | |
| 2019/0372760 A1 | 12/2019 | Zheng | |
| 2020/0036510 A1 | 1/2020 | Gomez | |
| 2020/0044862 A1 | 2/2020 | Yadlin | |
| 2020/0125933 A1 | 4/2020 | Aldea Lopez | |
| 2020/0158745 A1 | 5/2020 | Tian | |
| 2020/0186528 A1 | 6/2020 | Fan | |
| 2020/0193279 A1 | 6/2020 | Hostetler | |
| 2020/0202184 A1 | 6/2020 | Shrestha | |
| 2020/0228313 A1 | 7/2020 | Storm et al. | |
| 2020/0286145 A1 | 9/2020 | Storm | |
| 2020/0296128 A1 | 9/2020 | Wentz | |
| 2020/0322141 A1 | 10/2020 | Kinjo | |
| 2020/0327252 A1* | 10/2020 | McFall | G06F 21/78 |
| 2020/0342288 A1 | 10/2020 | Xi | |
| 2020/0372360 A1 | 11/2020 | Vu | |
| 2020/0374106 A1* | 11/2020 | Padmanabhan | G06F 16/162 |
| 2020/0389495 A1* | 12/2020 | Crabtree | G06F 16/2477 |
| 2020/0394334 A1* | 12/2020 | Bulut | G16H 10/60 |
| 2020/0402625 A1* | 12/2020 | Aravamudan | G06F 21/602 |
| 2021/0004485 A1* | 1/2021 | Summers | G06F 40/284 |
| 2021/0019605 A1 | 1/2021 | Rouhani | |
| 2021/0026860 A1 | 1/2021 | Wang | |
| 2021/0034602 A1* | 2/2021 | Levacher | G06F 16/2365 |
| 2021/0035330 A1 | 2/2021 | Xie | |
| 2021/0064760 A1 | 3/2021 | Sharma | |
| 2021/0092161 A1* | 3/2021 | Crabtree | H04L 63/20 |
| 2021/0133557 A1* | 5/2021 | Iyoob | G06N 3/08 |
| 2021/0142177 A1 | 5/2021 | Mallya | |
| 2021/0150024 A1 | 5/2021 | Zhang | |
| 2021/0157912 A1 | 5/2021 | Sai | |
| 2021/0194668 A1 | 6/2021 | Masters | |
| 2021/0248268 A1* | 8/2021 | Ardhanari | G06F 21/602 |
| 2021/0266170 A1* | 8/2021 | Rossi | G06F 21/32 |
| 2021/0314140 A1* | 10/2021 | Stephenson | H04L 63/0428 |
| 2021/0334621 A1 | 10/2021 | Shimizu | |
| 2021/0350357 A1* | 11/2021 | Lafontaine | G06Q 20/401 |
| 2021/0357859 A1* | 11/2021 | Malvankar | G06F 16/182 |
| 2021/0374502 A1 | 12/2021 | Roth | |
| 2021/0385069 A1* | 12/2021 | Reid | H04L 9/3239 |
| 2021/0406386 A1* | 12/2021 | Ortiz | G06F 21/602 |
| 2022/0004654 A1 | 1/2022 | Patel | |
| 2022/0012672 A1* | 1/2022 | Inman | G06F 21/6218 |
| 2022/0038271 A1 | 2/2022 | Ranellucci | |
| 2022/0050921 A1* | 2/2022 | LaFever | H04L 63/0407 |
| 2022/0051276 A1* | 2/2022 | Zelocchi | H04L 9/3297 |
| 2022/0108026 A1* | 4/2022 | Ortiz | H04L 9/321 |
| 2022/0121731 A1* | 4/2022 | Groth | G06F 21/16 |

OTHER PUBLICATIONS

Brisimi et al. "Federated learning of predictive models from federated electronic health records", International Journal of Medical Informatics, Apr. 2018, retrieved on Jan. 18, 2021 from http://www.ncbi.nlm.nih/gov/pmc/articles/PMC5838813/pdf/nihms936798.pdf.

Recommendations Jan. 2020 on measures that supplement transfer tools to ensure compliance with the EU level of protection of personal data, Adopted on Nov. 10, 2020, European Data Protection Board, 38 pages.

Abedi, Ali, and Shehroz S. Khan. "FedSL: Federated Split Learning on Distributed Sequential Data in Recurrent Neural Networks", arXiv preprint arXiv:2011.03180 (Year 2021).

Nir Bitansky et al., "Post-quantum Zero Knowledge in Constant Rounds"; Jun. 2020; 48 pages (Year 2020).

* cited by examiner

SOURCE FILE — WITH PHI DATA

| RECORD ID | FIRST | LAST | ADDRESS 1 | ADDRESS 2 | CITY | STATE | ZIP CODE | SEX |
|---|---|---|---|---|---|---|---|---|
| 508295697 | SUEANN | FAGERSTROM | 8112 SWEET STREET | | KANSAS CITY | MO | 64105 | F |
| 298347621 | MARYBETH | FERMOUTH | 9801 SOUTH 98TH STREET | APT 601 | OVERLAND PARK | KS | 64122 | F |

FIG. 2

SYSTEMS AND METHODS FOR PROVIDING A BLIND DE-IDENTIFICATION OF PRIVACY DATA

PRIORITY CLAIM

The present application claims priority to U.S. Provisional Application No. 63/116,656, filed Nov. 20, 2020, which is incorporated herein by reference.

RELATED APPLICATIONS

The present disclosure is related to application Ser. No. 16/828,085, application Ser. No. 16/828,216, application Ser. No. 16/828,354 (213-0102), and application Ser. No. 16/828,420, each filed on Mar. 24, 2020, and Application No. 63/030,930, filed on May 6, 2020, and each of which is incorporated herein by reference.

TECHNICAL FIELD

The present disclosure generally relates to improved approaches for de-identifying data prior to its use in training or processing by computer algorithms. De-identifying data can comply with regulations that govern the use of private medical data, such as the Health Insurance Portability and Accountability Act (HIPAA). Such regulations need to be followed while enabling organizations to work together to provide algorithms related to medical treatment to operate on patient data.

BACKGROUND

Artificial intelligence, machine learning models or other computer models are used in many areas of our lives. For example, Google searches use models to determine what type of search results to return to individual users. Speech processing technologies use trained models to be able to recognize speech. In another aspect, artificial intelligence or machine learning models can be used as diagnostic tools for medical applications. Medical images such as X-rays or MRIs can be submitted to a trained model to receive a diagnosis. Training data can be used to train the model to identify, for example, cancer or other medical issues that might be recognized within the images. Some companies develop artificial intelligence or machine learning models to aid in detecting medical issues. They provide these models as a service to hospitals for an appropriate fee. However, when applying these algorithms or models to real data in use or in training, one challenge exists which is not to expose private medical data in violation of policies such as the General Data Protection Regulations.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2 illustrates a source file of data for use in training artificial intelligence models or for use with trained models;

INTRODUCTION

Figure 1:
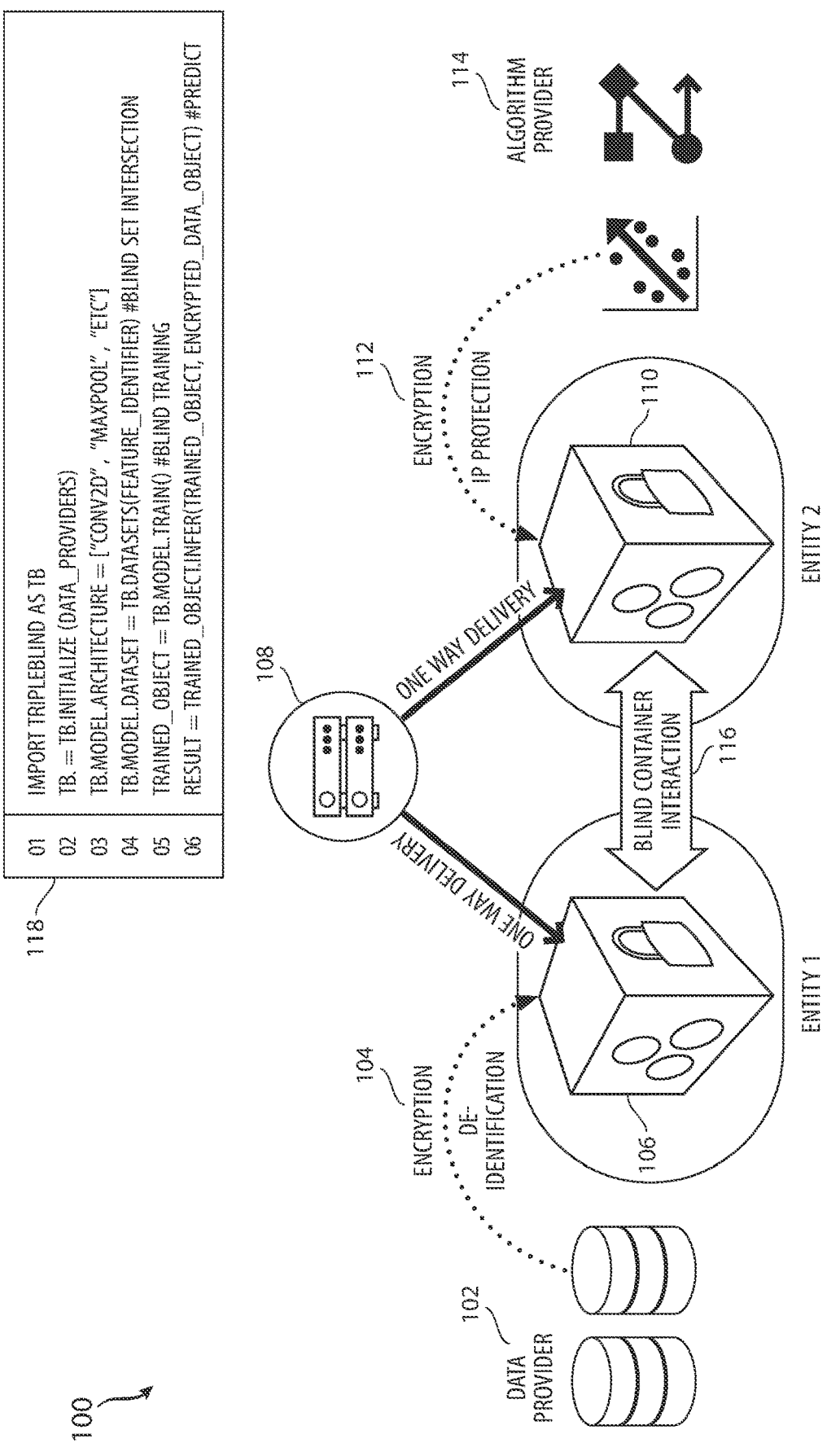
FIG. 1 illustrates an example framework for sharing algorithms and data in a blind manner.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example examples only, and is not intended to limit the scope, applicability, or configuration of the disclosure. Rather, the ensuing description of the examples will provide those skilled in the art with an enabling description for implementing an exemplary system or method. It should be understood that various changes may be made in the function and arrangement of elements without departing from the spirit and scope of the application as set forth in the appended claims. Any step or feature of any example can be combined with any other feature or step of any other example.

Overview

The present disclosure outlines an approach to solve the problems outlined above which involve how to handle private data that is going to be processed by an algorithm of some type. In order to de-identify the data in preparation for being processed by an algorithm, one example method includes splitting, at a first entity, a byte of data of an original record into a first random portion and a second random portion, inserting first random bits into the first random portion to yield a first new byte and inserting second random bits into the second random portion to yield a second new byte. The method then includes transmitting the second new byte to a second entity, receiving, at the first entity, a first portion of an algorithm from the second entity and processing the first new byte by the first portion of the algorithm to yield a first partial result. The first partial result can be combined with a second partial result from the second entity processing the second new byte by a second portion of the algorithm. Applying this approach can enable the data to comply with regulations regarding the privacy of data such as medical data. Note that a batch or snippet of data could also include other groups of bits besides just a byte of data, such as two bytes, or 10 bits of data, and so forth. The particular batch of data does not have to specifically be a byte of data.

The byte of data can relate to private data including one or more of a name, an address, a sex of a person, a medical condition associated with the person, an age of the person, and so forth. The original data can include a variety of parameters associated with the person, some of which, depending on the privacy regulation, may need to be de-identified. The first entity can be a data provider and the second entity can be an algorithm provider, although these entities can be interchangeable.

A separate entity can be used to exchange, between the first entity and the second entity, first interim partial results of the first portion of the algorithm operating on first additional bytes of data and second interim partial results of the second portion of the algorithm operating on second additional bytes of data. As respective portions of algorithms operate on respective randomized data, the system can exchange interim results to enable final partial results to ultimately be combined to produce the desired result in a manner that preserves privacy, both in terms of the data and in terms of the algorithm. In one aspect, the first random portion of the byte and the second random portion of the byte each can include one of an equal number of bits or a different number of bits. Each respective byte of data of the original record can be processed as set forth in claim 1 for the byte of data. A first number of bits in the first random portion and a second number of bits in the second random portion can be randomly chosen or fixed.

The method can be applied in an iterative fashion for each byte of data that includes the original record. The method can de-identify data in a way that technically enforces HIPAA/GDPR/CCPA standards. HIPAA refers to the Health Insurance Portability and Accountability Act, GDPR refers to the General Data Protection Regulation and CCPA refers to the California Consumer Privacy Act. Specific technical splitting and randomization of the data can be implemented to confirm to these various requirements. Each of these various standards have differing technical standards for adherence, but in general the HIPAA standard is that any data that is exchanged must be sufficiently "redacted" such that it cannot be used, either alone or in concert with other potentially available data, to identify the individual from which it came (the standard is actually "a very low probability" that it can be used in this way). The splitting and encryption embodied here renders the data share that goes to entity two useless with respect to identifying an individual. The CCPA and GDPR standards are slightly different, but using the same logic the data that is shared with entity two is again completely useless with respect to identifying an individual.

Another method can be practiced from the standpoint of the data provider or first entity. A method can include, at the first entity, splitting into two random portions each respective byte of a group of original private data in an iterative process to yield respective first portions and a respective second portion, inserting first random bits into the respective first portions to yield first respective new bytes, inserting second random bits into the respective second portions to yield second respective new bytes and transmitting the second respective new bytes to a second entity.

The method can include receiving, at the first entity, a first portion of an algorithm from the second entity and processing the first respective new bytes by the first portion of the algorithm to yield a first respective partial result. The first respective partial result can be combined with a second respective partial result from the second entity processing the second respective new bytes by a second portion of the algorithm. Aspects can also be defined from the standpoint of a third party handling the exchange of interim partial results as well as from the second entity or algorithm provider.

An example system can include a processor and a computer-readable storage medium storing instructions which, when executed by the processor, cause the processor to perform operations. The system can provide operating modules for a first entity and a second entity such that the proper operations, containers, and processing can occur at each respective entity as described herein. The operations of the system can include instructing a first module at a first entity (1) to split a byte of data of an original record into a first random portion and a second random portion, (2) to insert first random bits into the first random portion to yield a first new byte, (3) to insert second random bits into the second random portion to yield a second new byte and (4) to transmit the second new byte to a second entity and instructing a second module at a second entity to transmit, to the first entity, a first portion of an algorithm. The instructions can further include exchanging interim partial results between the first module and the second module while the first entity processes the first new byte by the first portion of the algorithm to yield a first partial result and the second entity processes the second new byte by a second portion of the algorithm to yield a second partial result. The instructions can cause the first partial result to be combined with the second partial result to yield full results of processing the original record by the algorithm. As noted above, the groups of data that can be processed are not limited to a byte of data but can be any structure of data that a user desires to be processed.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim. The foregoing, together with other features and examples, will become more apparent upon referring to the following specification, claims, and accompanying drawings.

DETAILED DESCRIPTION

Disclosed herein is a new system, a platform, compute environment, cloud environment, marketplace, or any other characterization of the system that will enable an improved approach to providing data for training or processing by neural networks. In one aspect, the data de-identification approach can be applied to a federated-split leaning framework that combines features from known approaches but that provides a training process that maintains privacy for data used to train the model from various client devices.

FIG. 1 illustrates the general framework 100 which applies to this disclosure. A data provider 102 represents an entity that will provide data to a second entity such as an algorithm provider 114. Data is encrypted and de-identified 104 and provided or transferred to a new location 106. In one aspect, the location 106 (called "Space A" below and it can also be characterized as a container) can also remain behind a firewall or protective boundary for the data provider computer systems. A container as would be known to one of skill in the art is a software package that contains everything the software needs to run. This can include the executable program as well as system tools, libraries, and settings. The physical or virtual systems can be separate and independent systems for security. The location 106 can be a software container configured to enable the data and a received portion of an algorithm to operate or run separate from other operations at the first entity 102. An algorithm provider 114 encrypts its algorithm and provides 112 the algorithm to a new location 110 (called "Space B" below and which also can be called a container) which can be internal or external to the algorithm provider 114. The new location 110 can also be a container operating to enable the processes to be performed at the algorithm provider 114 separate from other computer functions performed by the algorithm provider 114. One approach with entity 1's location 106 and entity 2's location 110 is to provide a fully containerized framework in which each respective container is blind to the data or algorithms in the other container.

An entity 108 can represent a router which connects container 106 to container 110. The router can provide to the different locations the location or cloud address of the other container. The router 108 can enable in one example a one-way delivery of data which generally includes exchanging interim partial results of partial algorithm operations on randomized data. As shall be explained, the de-identification operation occurs at feature 104, which is where the data is split byte-by-byte and one half of the encrypted split data is sent to the container 110. While the examples provided herein are in terms of bytes or bytes of data, the process can be broader in that it can a batch of data or batches of data which can have any number of bits, and which can include a byte of data.

The other half of the data is placed in container 106. The approach enables the data provider 102 to provide data to an algorithm provider 114 in such a manner as to enable the data to be processed by an algorithm and results to be generated without the data provider 102 sharing any private data with the algorithm provider 114 and without the algorithm provider 114 sharing the algorithm with the data provider 102. Example code 118 is provided to enable the initialization of the model and architecture through the use of an application programming interface which can be used to access the functionality. This disclosure focuses on a particular approach for de-identification 104 of the data for use in the context provided in FIG. 1.

In one example, the entity 108 can represent a router or other network component that enables a first entity 102 and a second entity 114 to be able to exchange data and algorithms in a secure and private manner through the containers 106, 110. In one example, operational modules can be provided from a server (not shown) which can be installed on a respective computer system of the first entity 102 and the second entity 114. These programming modules can enable the respective entities to create containers 106, 110, receive partial data or partial algorithms and perform operations such as splitting the data or the algorithms in the proper manner and exchanging partial data and partial algorithms with the other entity. The system can be used to set up and utilize containers in the respective computing environments which, in connection with the use of the application programming interface, can enable the functionality described herein.

Next is described the process of initial creation of encrypted data and an encrypted algorithm with reference to FIG. 1. The data provider 102 reads raw data and encrypts it as it is brought into Space A 106, after which time it is "encrypted data." In one aspect, at this point, none of the data—whether the raw data or the encrypted data—has exited the firewall of the data provider 102. Space A 106 can represent a container at the location of the data provider 102. The algorithm provider 114 reads the algorithm that is to be used to process the data and encrypts it as it is brought into Space B 110, after which time it is the "encrypted algorithm." At this point, no part of the Algorithm—whether the original algorithm or the encrypted algorithm—has exited the firewall of the algorithm provider 114.

This disclosure in one aspect will collectively refer to the encrypted data and the encrypted algorithm as "encrypted objects." Next is described the process of dividing the encrypted objects. The disclosed technology is based on a form of distributed computing. The encrypted objects are randomly divided 104 into smaller pieces—on a byte-by-byte (or batch-by-batch) basis. After the random pieces are created, the system or router 108 helps coordinate a split of the data between Space A 106 and Space B 110. Another way of characterizing this is between a first container 106 and a second container 110. In one aspect, a portion of random pieces of the encrypted data are moved into Space B 110 from Space A 106. The algorithm provider 114 does not have access to the random pieces in Space B 110, but if it did, (i) the data is encrypted; and (ii) if were able to reverse the encryption, it would still be missing the other (random) half or portion needed to make sense of the data. In one aspect, the data can be determined to be "de-identified" once it is split and encrypted.

Next, a portion of the random pieces of the encrypted algorithm in Space B 110 is transmitted into Space A 106. The data provider 102 does not have access to the random pieces in Space A 106, but if it did, it would be missing the other (random) half or portion of the algorithm. Note that in FIG. 1, the Space A 106 and Space B 110 can be virtualized container spaces on computer systems of the data provider 102 and algorithm provider 114. Containers provide a way to virtualize a computer operating system so that multiple workloads can ran on a single operating system instance. They can be used to compartmentalize or separate the operations disclosed herein from the other computer operations of the data provider 102 and the algorithm provider 114. Processing operations are performed by each of Space A 106 and Space B 110 and only the outputs from those separate processing operations are shared between the parties as managed by a system or modules configured to perform these various processes to enable the full output to be constructed. Note that in one aspect, the router 108 only connects the container 106 to the container 110. The router 108 in this aspect, does not access any data or any of the algorithms and cannot "see" any of the results. This can ensure the data provider 102 and the algorithm provider 114 that their data/algorithms stays private to them and that no other entity or server has a "backdoor" into their computer systems.

Although containers are mentioned by way of an example environment to define Space A 106 and Space B 110, other virtual or hardware compute environments could be used as well.

Space A 106 runs random parts or randomized bytes of the encrypted data through random pieces of the encrypted algorithm and generates an output (a "partial output"). Space B 110 runs random parts of the encrypted data through random pieces of the encrypted algorithm and generates its partial output. The data provider 106 and the algorithm provider 110 directly communicate with each other to exchange the partial outputs, which is put together into the "final output." In another aspect, they can indirectly communicate with each other through the system 108. In one aspect, there are interim partial outputs that are shared through the process of generating the final partial outputs. The final partial outputs are then combined to yield the final output.

The algorithm provider 114 can decrypt the final output. For example, if the "question" answered by the algorithm is "What is the likelihood that fraud has occurred?", the algorithm provider 114 can decrypt a score such as "75% chance of fraud" but will not have access to any of the transactional input data from the data provider 102. The algorithm provider 114 can have the ability to deliver the output to the data provider 102, but in some situations (e.g., machine learning), the data provider 102 may not have a need to access the final output.

In one example, an example of this disclosure can focus on the steps or operations performed by respective code that is operated in one or more of the container 106 or container 110. For example, the container 106 can include a processor and a computer-readable storage medium that stores instructions which, when executed by the processor, cause the processor to perform operations. The operations can include one or more of instructing a first module at a first entity 102 (1) to split a byte of data of an original record into a first random portion and a second random portion, (2) to insert first random bits into the first random portion to yield a first new byte, (3) to insert second random bits into the second random portion to yield a second new byte and (4) to transmit the second new byte to a second entity. The operations can include instructing a second module at a second entity 114 to transmit, to the first entity, a first portion of an algorithm. The first entity 102 can be a data provider and the second entity 114 can be an algorithm provider. Similar operations can occur for the algorithm and be performed by a processor and respective code in the container 110. Thus, the respective code to perform these operations can be found in the respective containers 106/110. The router 108 may simply pass HTTPS end points to the containers (i.e., container 106 and 110's respective address) so they know where to connect. In one aspect, container 106 only knows the HTTPS address to send its "output" to. The container 106 has no idea what container 110 is going to do with the data.

The instructions can further cause the processor to perform the operation of exchanging interim partial results between the first module 102 and the second module 114 while the first entity processes the first new byte by the first portion of the algorithm to yield a first partial result and the second entity processes the second new byte by the second portion of the algorithm to yield a second partial result. The instructions can further include causing the first partial result to be combined with the second partial result to yield full results of processing the original record by the algorithm. In another aspect, the instructions can further include exchanging interim partial outputs in order to develop the first partial output and the second partial output.

FIG. 2 illustrates a source file with private data including a first and last name of a client, address information, city information, the state information, and ZIP Code information. In one example, the process disclosed herein is used to de-identifying data and includes splitting each data element on each record in a random fashion byte by byte (or batch by batch) and encrypting the relative splits. Splitting the data automatically de-identifies it. The encryption process is the second layer of protection to ensure that the random split cannot be used to identify an individual. This approach enables the protection of private data and thus enables the process to comply with the HIPAA, GDPR and/or CCPA. Other data can be provided beyond what is shown in FIG. 2, as this set of data represents an example of an original data set that might need to be de-identified.

Figure 3:
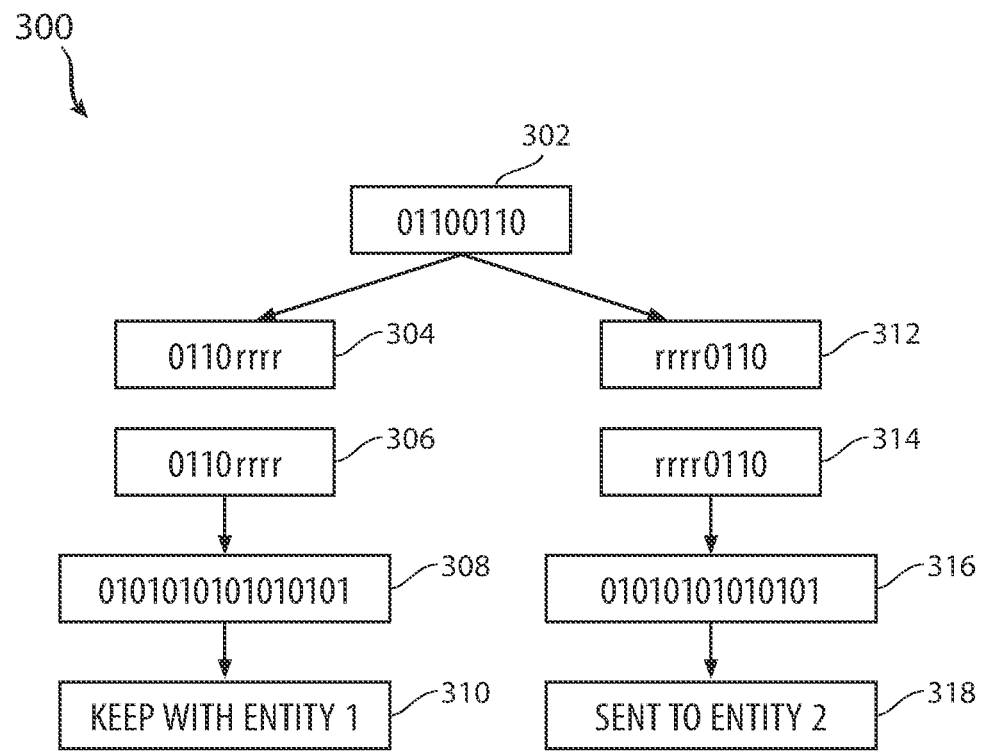
FIG. 3 illustrates the randomization of original records.

FIG. 3 illustrates the specific process 300. This process prepares the data to enter a clean room or secure environment. The example in FIG. 3 will be with respect to the last column in FIG. 2 which describes the sex of the person. The letter "f" for female is represented in ASCII as 01100110.

The original record 302 in one example therefore is a byte of data having 8 bits: 01100110. In a first step, the process includes splitting this byte of data into random halves where "rrrr" represent random bits inserted 304, 312.

In one example, the process can include randomly splitting a respective byte into two portions. For example, the byte 302 has 8 bits. The process can include randomly dividing this into two sets of bits. The example shown in FIG. 3 splits the byte into two equal halves with four bits each, with 4 "rrrr" random bits added or inserted. Thus, each randomized portion also has eight bits. Variations can include randomly determining how to split the original byte 302. For example, a first random portion could be 011 (3 bits) and the second random portion might be 00110 (5 bits). Then the first random portion would have five random bits added and the second random portion would have three random bits added. The respective number of bits in each portion can be randomly determined (the split could be 1/7, 2/6, 3/5, 4/4 chosen on a random basis), or could be fixed at 4/4 or any other value. The mode of splitting can also be determined based on formal privacy requirements.

The split shown in FIG. 3 also includes contiguous bits. However, the split, for example, could result in a first portion which is 0xx0x1xx (non-contiguous). Then, the "x" bits could be replaced with random bits 0rr0r1rr in a noncontiguous configuration. Thus, FIG. 3 represents one example of how to split a byte (or any batch) into two random portions and then insert random bits into each portion to generate new bytes that have at least a portion of each new byte being randomly generated bits.

In another example, the resulting new bytes also do not have to have the same number of total bits as the original byte. The new bytes could have less than or more than the number of bits in the original byte 302. While FIG. 3 shows eight bits in both the original record 302 and the random halves 304, 312, the number of bits could change as well. For example, the new bytes 306, 314 could have sixteen bits each such as rrrrrrrr0110rrr.

Where greater randomization or de-identification may be required for a specific purpose or for a specific legal requirement, different strategies can be implemented with respect to the splitting and randomization. For example, splitting the bytes equal sets of bits might enable compliance with one privacy regulation where randomly splitting the data into random different bit sets that add up to eight might comply with another legal requirement. Therefore, the system may determine what level of randomization or de-identification is required with reference to a specific privacy requirement and then implement a particular mode of splitting and randomization to comply with that requirement.

In the next step, the new bytes 306, 314 are then encrypted into a first encrypted byte 308 and a second encrypted byte 316. In a third step, the first encrypted byte 308 is kept with a first entity 310 and the second encrypted byte 318 it is transmitted to a second entity. In one example, the first entity can be a data provider and the second entity can be an algorithm provider. The data that is transmitted to the second entity (the only data that is being moved) has no personal health information (PHI) in that the "f" (sex of the patient) is gone from the data and it is unintelligible if it is ever leaked. Furthermore, it only exists at runtime and it is deleted immediately thereafter.

The process is described above with respect to one original byte of data 302. Of course, the operations can process iteratively byte after byte of personal data or any other type of data which needs to be de-identified. For example, the process can occur for the six bytes of data that would represent "SueAnn" in FIG. 2. The six letters of her name can be represented by six bytes of data. The bytes individually or as a group could be split into two random portions with random bits inserted into each random portion using the one or more of the various example processes described herein. The process can then be iterative through all of the various private data then needs to be de-identified.

In one aspect, a two-step process can include removing a number of specific data elements from original data, such as name, age, address, etc. For some data, this step can involve just dropping a column from a spreadsheet. However, for other data—like text—this step can be hard to perform as part of a manual process. The remaining data then should be inspected by an expert to certify that there is "a low probability" that this particular data can't be used to identify an individual, even if it is combined with other possibly available data. For example, if there is a dataset about a rare disease, the process cannot leave zip code in the data because the person with the disease could be the only person in a zip code with the disease. It would be fairly easy to figure out that a particular record relates to that person. Genetic data can also be challenging, where the actual data can be used to identify a particular individual. If an entity gets a person's full genetic content, then another entity might only need a very small genetic snippet to find a match or find that person in a dataset.

The disclosed blind de-identification process eliminates those expensive, onerous and time-consuming steps. The disclosed approach, which "splits" the data byte by byte, and then encrypts the part that gets sent to the "other party", renders the data de-identified.

The process of splitting and then encrypting the shares as described herein and uses particular splitting technology to de-identify data in a way that technically enforces HIPAA/GDPR/CCPA compliance.

Figure 4A:
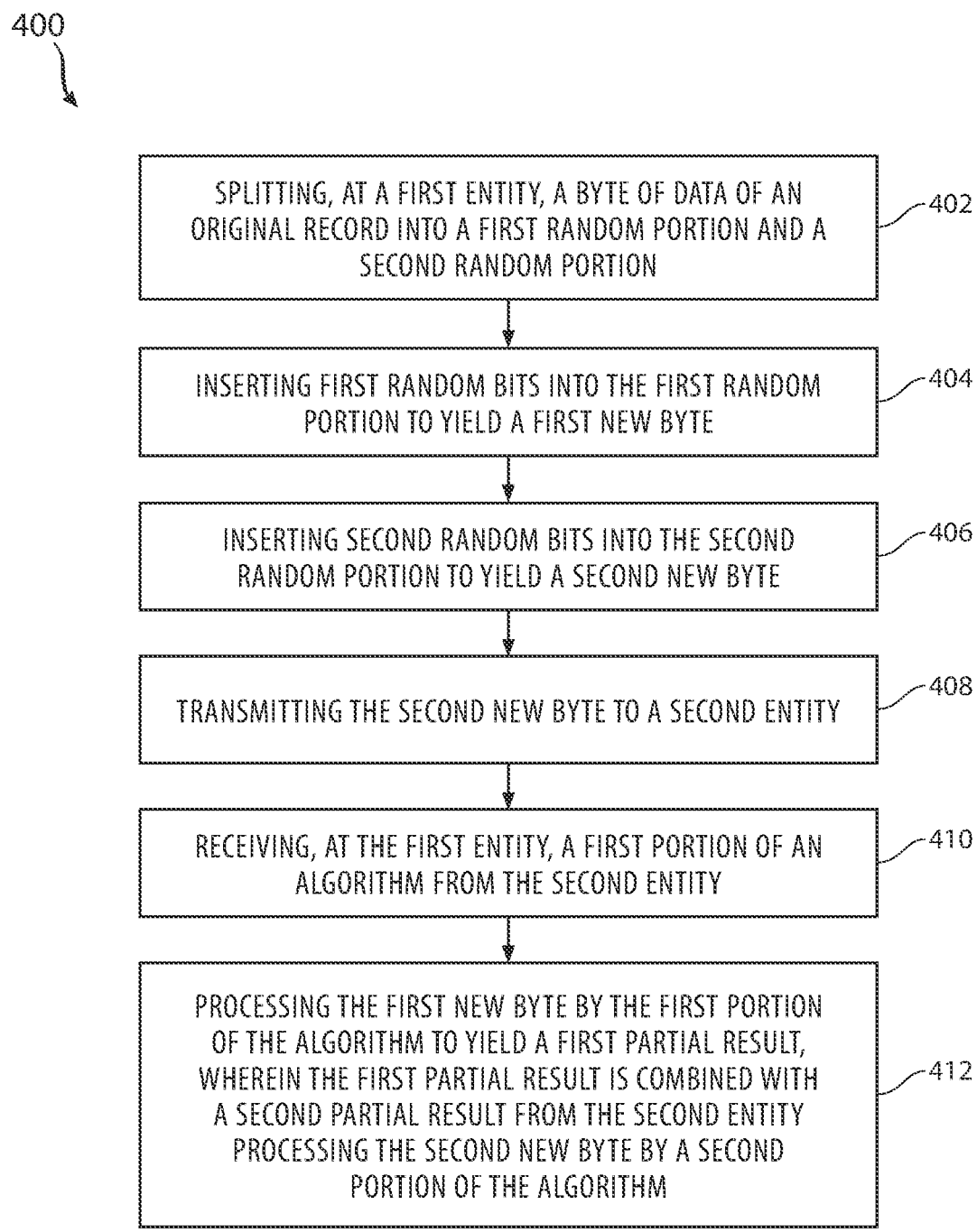
FIG. 4A illustrates an example method related to splitting data.

FIG. 4A illustrates an example method 400. The method can include splitting, at a first entity, a byte of data of an original record into a first random portion and a second random portion (402), inserting first random bits into the first random portion to yield a first new byte (404), inserting second random bits into the second random portion to yield a second new byte (406), transmitting the second new byte to a second entity (408), receiving, at the first entity, a first portion of an algorithm from the second entity (410) and processing the first new byte by the first portion of the algorithm to yield a first partial result, wherein the first partial result is combined with a second partial result from the second entity processing the second new byte by a second portion of the algorithm (412). A first number of bits in the first random portion and a second number of bits in the second random portion can be randomly chosen or fixed.

The byte of data relates to private data and can include one or more of a name, an address, a sex of a person, a medical condition associated with the person, and/or an age of the person. A separate entity such as the system 108 described above can exchange between the first entity and the second entity first interim partial results of the first portion of the algorithm operating on first additional bytes of data and second interim partial results of the second portion of the algorithm operating on second additional bytes of data. In one aspect, each respective byte of data of the original record is processed as set forth herein for the byte of data. The method results in technical enforcement of de-identify data in a way that technically enforces HIPAA/GDPR/CCPA standards.

The term byte is meant to indicate a group of bits of data. In other aspect, a batch or snippet of data could also include other groups of bits besides just a byte of data, such as two bytes, or 10 bits of data, and so forth. The particular size of the batch of data does not have to specifically be a byte of data.

Figure 4B:
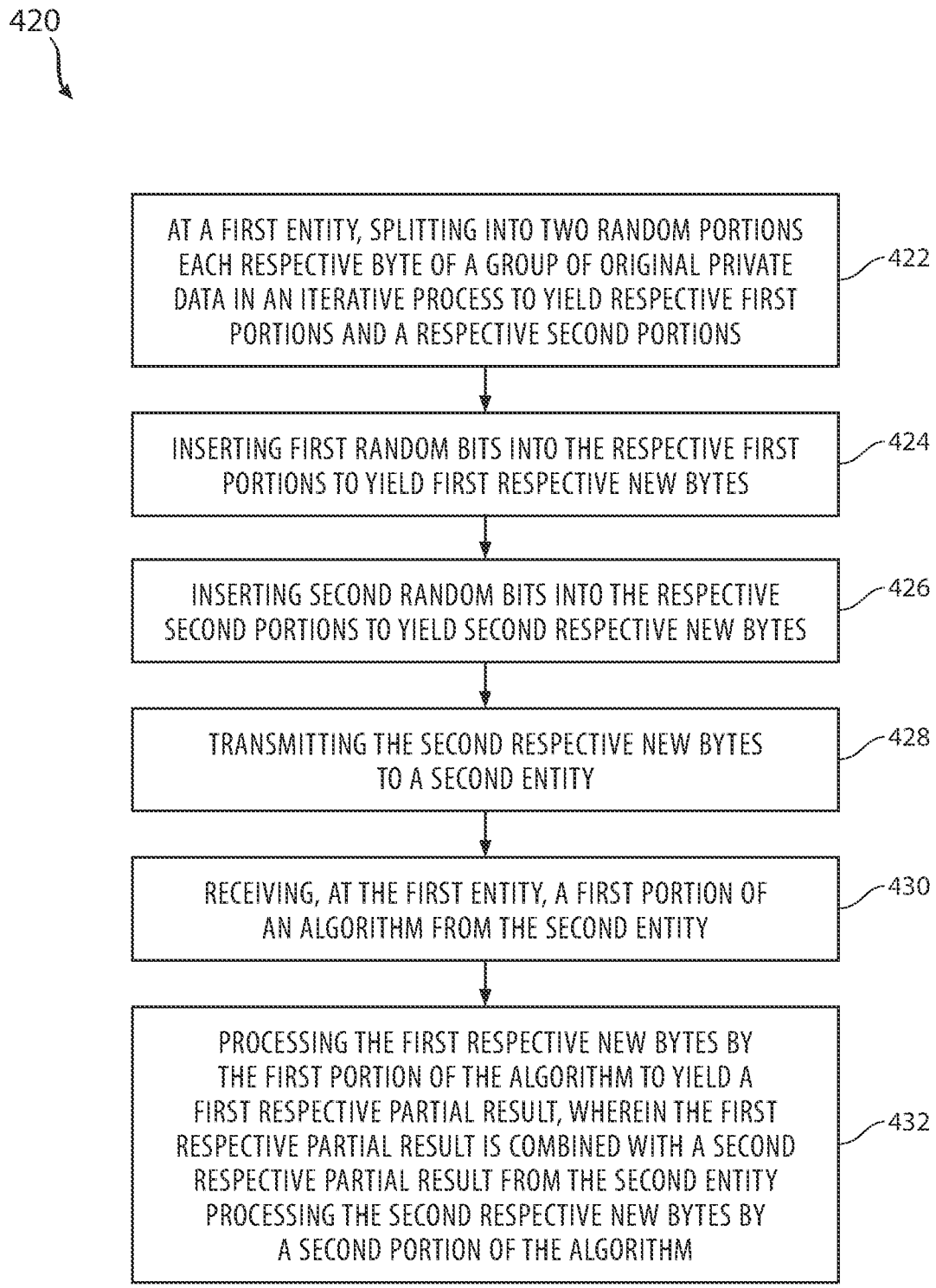
FIG. 4B illustrates another example method of splitting data.

FIG. 4B illustrates another method example 420. The method includes, at a first entity, splitting into two random portions each respective byte of a group of original private data in an iterative process to yield respective first portions and a respective second portions (422), inserting first random bits into the respective first portions to yield first respective new bytes (424), inserting second random bits into the respective second portions to yield second respective new bytes (426), transmitting the second respective new bytes to a second entity (428), receiving, at the first entity, a first portion of an algorithm from the second entity (430) and processing the first respective new bytes by the first portion of the algorithm to yield a first respective partial result, wherein the first respective partial result is combined with a second respective partial result from the second entity processing the second respective new bytes by a second portion of the algorithm (432). In this manner, each byte of the original data is processed and randomized which can enable enforcement of the HIPAA/GDPR/CCPA standards for private data.

Figure 5:
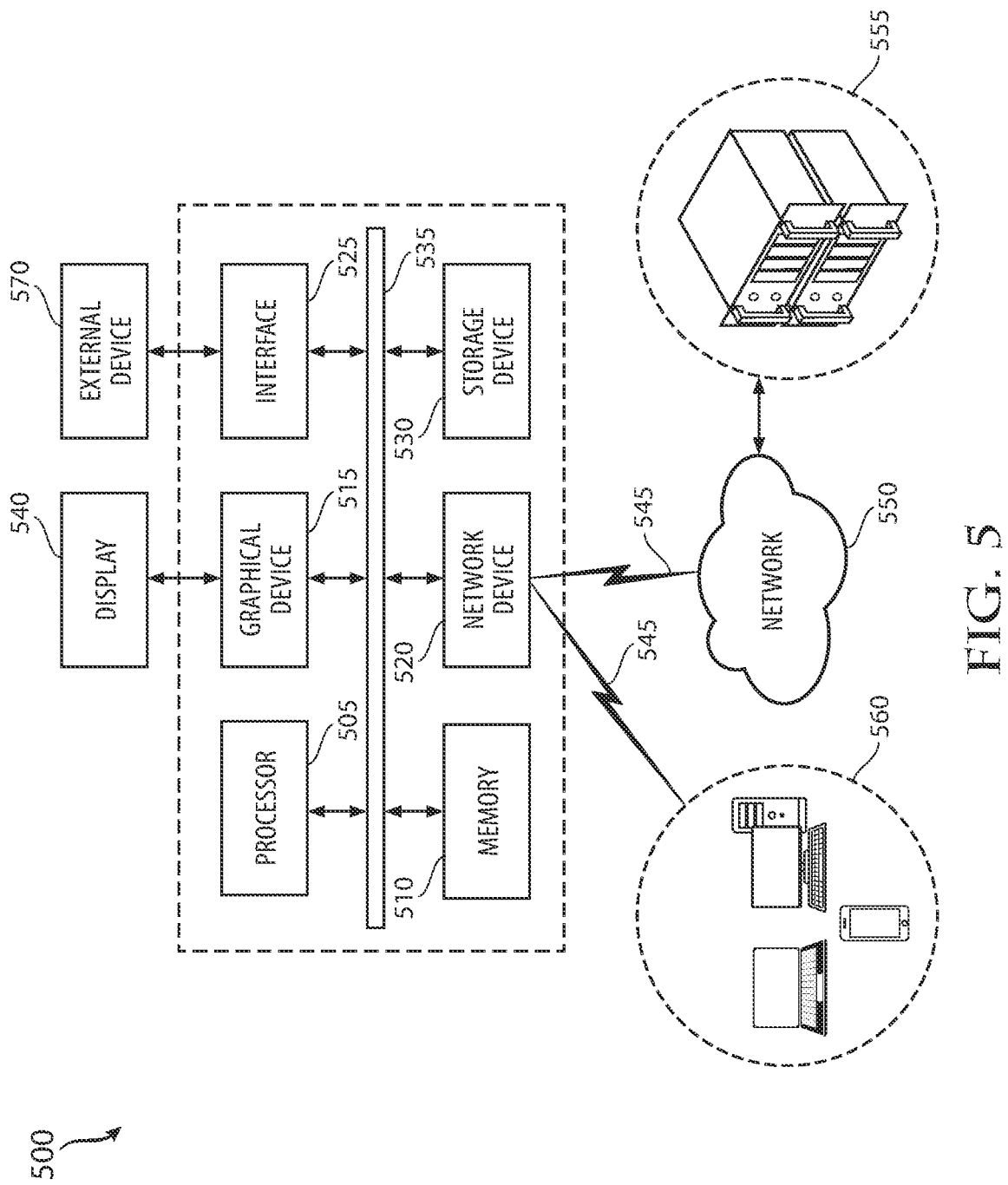
FIG. 5 illustrates an example system or device according to some aspects of this disclosure.

FIG. 5 illustrates an example computer system 500 for implementing a part of the instant disclosure. For example, the example computer system 500 may execute a client application for performing the instant disclosure.

The example computer system 500 includes a processor 505, a memory 510, a graphical device 515, a network device 520, interface 525, and a storage device 530 that are connected to operate via a bus 535. The processor 505 reads causes machine instructions (e.g., reduced instruction set (RISC), complex instruction set (CISC), etc.) that are loaded into the memory 510 via a bootstrapping process and executes an operating system (OS) for executing application within frameworks provided by the OS. For example, the processor 505 may execute an application that executes an application provided by a graphical framework such as Winforms, Windows Presentation Foundation (WPF), Windows User Interface (WinUI), or a cross platform user interface such as Xamarin or QT. In other examples, the processor 505 may execute an application that is written for a sandbox environment such as a web browser.

The processor 505 controls the memory 510 to store instructions, user data, operating system content, and other content that cannot be stored within the processor 505 internally (e.g., within the various caches). The processor 505 may also control a graphical device 515 (e.g., a graphical processor) that outputs graphical content to a display 540. In some examples, the graphical device 515 may be integral within the processor 505. In yet another example, the display 540 may be integral with the computer system 500 (e.g., a laptop, a tablet, a phone, etc.).

The graphical device 515 may be optimized to perform floating point operations such as graphical computations, and may be configured to execute other operations in place of the processor 505. The processor 505 may be controlled by instructions to perform mathematical operations optimized for floating point math. For example, the processor 505 may allocate instructions to the graphical device 515 for operations that are optimized for the graphical device 515. For instance, the graphical device 515 may execute operations related to artificial intelligence (AI), natural language processing (NLP), vector math. The results may be returned to the processor 505. In another example, the application executing in the processor 505 may provide instructions to cause the processor 505 to request the graphical device 515 to perform the operations. In other examples, the graphical device 515 may return the processing results to another computer system (i.e, distributed computing).

The processor 505 may also control a network device 520 that transmits and receives data using a plurality of wireless channels 545 and at least one communication standard (e.g., Wi-Fi (i.e., 802.11ax, 802.11e, etc.), Bluetooth®, various standards provided by the 3rd Generation Partnership Project (e.g., 3G, 4G, 5G), or a satellite communication network (e.g., Starlink). The network device 520 may wirelessly connect to a network 550 to connect to servers 555 or other service providers. The network device 520 may also be connected to the network 550 via a physical (i.e., circuit) connection. The network device 520 may also directly connect to local electronic device 560 using a point-to-point (P2P) or a short range radio connection.

The processor 505 may also control an interface 525 that connects with an external device 570 for bidirectional or unidirectional communication. The interface 525 is any suitable interface that forms a circuit connection and can be implemented by any suitable interface (e.g., universal serial bus (USB), Thunderbolt, and so forth). The external device 565 is able to receive data from the interface 525 to process the data or perform functions for different applications executing in the processor 505. For example, the external device 565 may be another display device, a musical instrument, a computer interface device (e.g., a keyboard, a mouse, etc.), an audio device (e.g., an analog-to-digital converter (ADC), a digital-to-analog converter (DAC)), a storage device for storing content, an authentication device, an external network interface (e.g., a 5G hotspot), a printer, and so forth.

It is noted that in one aspect, the steps disclosed herein can be practiced by a "system." The system can include the server and one or more clients together or might just be functionality performed by a server. Claims can be included which outline the steps that occur from the standpoint of any device disclosed herein. For example, steps of transmission, calculation, and receiving of data, or other claimed steps can be claimed from the standpoint of a server device, a client device, or group of client devices, or any entity depending on which example is being covered. All such communication from the standpoint of an individual component or device can be included as within the scope of a particular embodiment focusing on that device.

In another aspect, the system can include a platform as disclosed in the patent applications incorporated by reference also performing steps in coordination with the concept disclosed above. Therefore, the platform as used to provide the federated-split learning process described herein is also an embodiment of this disclosure and steps can be recited in connection with the use of that platform for training models in a manner that maintains privacy of the data as described herein.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
    splitting, at a first entity, a batch of data of an original record into a first random portion and a second random portion;
    inserting first random bits into the first random portion to yield a first new batch;
    inserting second random bits into the second random portion to yield a second new batch;
    transmitting the second new batch to a second entity;
    receiving, at the first entity, a first portion of an algorithm from the second entity; and
    processing the first new batch by the first portion of the algorithm to yield a first partial result, wherein the first partial result is combined with a second partial result from the second entity processing the second new batch by a second portion of the algorithm.

2. The method of claim 1, wherein the batch of data relates to private data comprises one or more of a names, an address, a sex of a person, a medical condition associated with the person, an age of the person.

3. The method of claim 1, wherein the first entity is a data provider and the second entity is an algorithm provider.

4. The method of claim 1, wherein a separate entity exchanges, between the first entity and the second entity, first interim partial results of the first portion of the algorithm operating on first additional batches of data and second interim partial results of the second portion of the algorithm operating on second additional batches of data.

5. The method of claim 1, wherein the first random portion of the batch and the second random portion of the batch each comprise one of an equal number of bits or a different number of bits.

6. The method of claim 1, wherein each respective batch of data of the original record is processed for the respective batch of data.

7. The method of claim 1, wherein the method is applied in an iterative fashion for each respective batch of data that comprises the original record.

8. The method of claim 1, wherein the method de-identifies data in a way that technically enforces HIPAA/GDPR/CCPA standards.

9. The method of claim 1, wherein a first number of bits in the first random portion and a second number of bits in the second random portion are randomly chosen or fixed.

10. A method comprising:
    at a first entity, splitting into two random portions each respective batch of a group of original private data in an iterative process to yield respective first portions and a respective second portions;
    inserting first random bits into the respective first portions to yield first respective new batches;
    inserting second random bits into the respective second portions to yield second respective new batches;
    transmitting the second respective new batches to a second entity;
    receiving, at the first entity, a first portion of an algorithm from the second entity; and processing the first respective new batches by the first portion of the algorithm to yield a first respective partial result, wherein the first respective partial result is combined with a second respective partial result from the second entity processing the second respective new batches by a second portion of the algorithm.

11. The method of claim 10, wherein the respective first portions and the respective second portions each comprise one of an equal number of bits or a different number of bits.

12. The method of claim 10, wherein a first number of bits in the respective first portions and a second number of bits in the respective second portions are randomly chosen or fixed.

13. A system comprising:
a processor; and
a computer-readable storage medium storing instructions which, when executed by the processor, cause the processor to perform operations comprising:
instructing a first module at a first entity (1) to split a batch of data of an original record into a first random portion and a second random portion, (2) to insert first random bits into the first random portion to yield a first new batch, (3) to insert second random bits into the second random portion to yield a second new batch and (4) to transmit the second new batch to a second entity;
instructing a second module at a second entity to transmit, to the first entity, a first portion of an algorithm;
exchanging interim partial results between the first module and the second module while the first entity processes the first new batch by the first portion of the algorithm to yield a first partial result and the second entity processes the second new batch by a second portion of the algorithm to yield a second partial result; and
causing the first partial result to be combined with the second partial result to yield full results of processing the original record by the algorithm.

14. The system of claim 13, wherein the first entity comprises a data provider and wherein the second entity comprises an algorithm provider.

15. A system comprising:
a processor; and
a computer-readable storage medium storing instructions which, when executed by the processor, cause the processor to perform operations comprising:
splitting into two random portions each respective batch of a group of original private data in an iterative process to yield respective first portions and a respective second portions;
inserting first random bits into the respective first portions to yield first respective new batches;
inserting second random bits into the respective second portions to yield second respective new batches;
transmitting the second respective new batches to an entity;
receiving a first portion of an algorithm from the entity; and
processing the first respective new batches by the first portion of the algorithm to yield a first respective partial result, wherein the first respective partial result is combined with a second respective partial result from the entity processing the second respective new batches by a second portion of the algorithm.

16. The system of claim 15, wherein the respective first portions and the respective second portions each comprise one of an equal number of bits or a different number of bits.

17. The system of claim 16, wherein a first number of bits in the respective first portions and a second number of bits in the respective second portions are randomly chosen or fixed.

* * * * *